US012658371B2

(12) United States Patent
Kim et al.

(10) Patent No.: US 12,658,371 B2
(45) Date of Patent: Jun. 16, 2026

(54) MULTILAYER ELECTRONIC COMPONENT

(71) Applicant: SAMSUNG ELECTRO-MECHANICS CO., LTD., Suwon-si (KR)

(72) Inventors: Sung Soo Kim, Suwon-si (KR); Jae Young Na, Suwon-si (KR); Jin Hyung Lim, Suwon-si (KR); Jung Won Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 420 days.

(21) Appl. No.: 18/130,965

(22) Filed: Apr. 5, 2023

(65) Prior Publication Data

US 2024/0222025 A1 Jul. 4, 2024

(30) Foreign Application Priority Data

Dec. 29, 2022 (KR) ......................... 10-2022-0188990

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
CPC ........ H01G 4/232; H01G 4/2325; H01G 4/30; H01G 4/248; H01G 4/228
USPC ..................... 361/301.4, 321.1, 306.3, 321.3
See application file for complete search history.

(56) References Cited

U.S. PATENT DOCUMENTS

| | | | | |
|---|---|---|---|---|
| 2009/0303655 A1* | 12/2009 | Ogawa | ..................... | H01G 4/30 |
| | | | | 29/25.42 |
| 2013/0128411 A1* | 5/2013 | Tahara | ..................... | H01G 4/12 |
| | | | | 361/321.2 |
| 2013/0258546 A1* | 10/2013 | Kim | ......................... | H01G 4/30 |
| | | | | 156/89.18 |
| 2014/0002950 A1* | 1/2014 | Gu | ......................... | H01G 4/005 |
| | | | | 29/25.42 |
| 2016/0024868 A1* | 1/2016 | Vachon | ............... | E21B 41/0007 |
| | | | | 166/368 |
| 2016/0276104 A1 | 9/2016 | Nishisaka et al. | | |
| 2017/0287640 A1* | 10/2017 | Choi | ......................... | H01G 4/30 |
| 2018/0144869 A1* | 5/2018 | Yoon | ......................... | H01G 4/30 |
| 2019/0103225 A1* | 4/2019 | Han | ..................... | H01G 4/2325 |

(Continued)

FOREIGN PATENT DOCUMENTS

| | | |
|---|---|---|
| JP | 2016-178219 A | 10/2016 |
| JP | 2019-009463 A | 1/2019 |
| JP | 2020-013846 A | 1/2020 |

*Primary Examiner* — Arun Ramaswamy

(74) *Attorney, Agent, or Firm* — Morgan, Lewis & Bockius LLP

(57) ABSTRACT

A multilayer electronic component according to an embodiment of the present disclosure includes a body including a dielectric layer and internal electrodes; and an external electrode including a base electrode layer connected to the internal electrode, a thin film electrode layer disposed on the base electrode layer, and a plating layer disposed on the thin film electrode layer, wherein an average thickness of the base electrode layer may be 1 μm or more and 3 μm or less, and an average thickness of the thin film electrode layer may be 300 nm or more and 800 nm or less.

17 Claims, 8 Drawing Sheets

(56)                              References Cited

U.S. PATENT DOCUMENTS

2020/0027662  A1      1/2020  Suga et al.
2022/0130609  A1*    4/2022  Kim ...................... H01G 4/232

* cited by examiner

FIRST
DIRECTION

SECOND
DIRECTION

THIRD
DIRECTION

K1

K2

5 μm

MULTILAYER ELECTRONIC COMPONENT

CROSS-REFERENCE TO RELATED APPLICATION(S)

This application claims the benefit of priority to Korean Patent Application No. 10-2022-0188990 filed on Dec. 29, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of any of various electronic products, such as an imaging device, including a liquid crystal display (LCD) or a plasma display panel (PDP), a computer, a smartphone, or a mobile phone, serving to charge or discharge electricity therein or therefrom.

Such a multilayer ceramic capacitor has a small size, implements high capacitance, and is easily mounted on a circuit board, and may thus be used as a component of various electronic devices. There has been increasing demand for a multilayer ceramic capacitor to have a reduced size and higher capacitance as each of various electronic devices such as a computer and a mobile device have a reduced size and higher output. In addition, as the application thereof to electronic parts for automobiles has increased, high reliability in various environments is required.

To achieve miniaturization and high capacitance of a multilayer ceramic capacitor, it is necessary to improve capacitance per unit volume of the multilayer ceramic capacitor by minimizing a volume of the external electrode.

When the external electrode is formed thinly in order to minimize the volume of the external electrode, fine voids may exist, and thereby, moisture, plating solution, and the like, may permeate into a body and there may be a concern that reliability may deteriorate.

Therefore, there is a need for a method capable of improving reliability while minimizing the volume of the external electrode.

SUMMARY

An aspect of the present disclosure is to provide a multilayer electronic component having excellent reliability.

An aspect of the present disclosure is to provide a multilayer electronic component having improved capacitance per unit volume.

However, the object of the present invention is not limited to the above, and will be more easily understood in the process of describing specific embodiments of the present disclosure.

According to an aspect of the present disclosure, a multilayer electronic component may include: a body including a dielectric layer and first and second internal electrodes alternately disposed with the dielectric layer interposed therebetween in a first direction, the body having first and second surfaces, opposing each other in the first direction, third and fourth surfaces connected to the first and second surfaces and opposing each other in a second direction, and fifth and sixth surfaces connected to the first to fourth surfaces and opposing each other in a third direction; a first external electrode including a first base electrode layer disposed on the third surface and connected to the first internal electrode, a first thin film electrode layer disposed on the first base electrode layer, and a first plating layer disposed on the first thin film electrode layer; and a second external electrode including a second base electrode layer disposed on the fourth surface and connected to the second internal electrode, a second thin film electrode layer disposed on the second base electrode layer, and a second plating layer disposed on the second thin film electrode layer, wherein an average thickness of the first base electrode layer and an average thickness of the second base electrode layer may be 1 μm or more and 3 μm or less, and an average thickness of the first thin film electrode layer and an average thickness of the second thin film electrode layer may be 300 nm or more and 800 nm or less.

According to another aspect of the present disclosure, a multilayer electronic component may include: a body including a dielectric layer and first and second internal electrodes alternately disposed with the dielectric layer interposed therebetween in a first direction, the body having first and second surfaces, opposing each other in the first direction, third and fourth surfaces connected to the first and second surfaces and opposing each other in a second direction, and fifth and sixth surfaces connected to the first to fourth surfaces and opposing each other in a third direction; a first external electrode including a first base electrode layer disposed on the third surface and connected to the first internal electrode, and a first plating layer disposed to cover the first base electrode layer; and a second external electrode including a second base electrode layer disposed on the fourth surface and connected to the second internal electrode, and a second plating layer disposed to cover the second base electrode layer, wherein a first thin film electrode layer is disposed between the first base electrode layer and the first plating layer, and two opposing ends of the first thin film electrode layer are disposed between an extension line of the second surface and an extension line of the first surface, and a second thin film electrode layer is disposed between the second base electrode layer and the second plating layer, and two opposing ends of the second thin film electrode layer are disposed between an extension line of the second surface and an extension line of the first surface.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
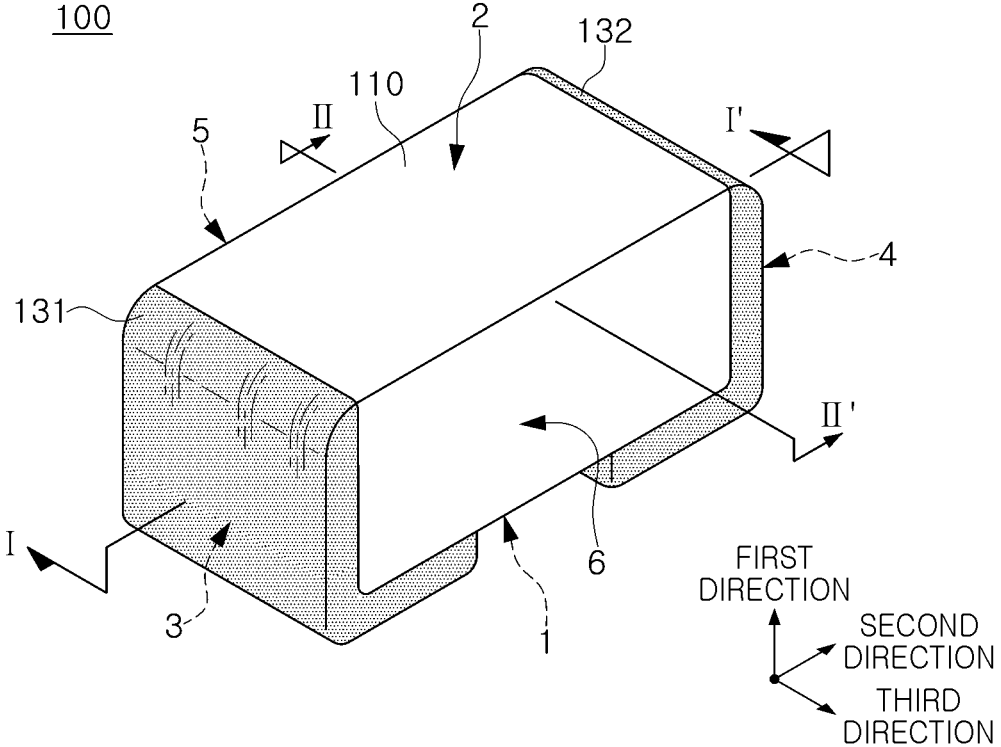
FIG. 1 schematically illustrates a perspective view of a multilayer electronic component according to an embodiment of the present disclosure.

Hereinafter, embodiments of the present disclosure will be described as follows with reference to the attached drawings. The present disclosure be may, however, exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may further include other components as well, rather than excluding other components, unless specifically stated otherwise.

In the drawings, a first direction may refer to a laminating direction or a thickness (T) direction, a second direction may refer to a length (L) direction, and a third direction may refer to a width (W) direction.

Multilayer Electronic Component

FIG. 1 schematically illustrates a perspective view of a multilayer electronic component according to an embodiment of the present disclosure.

Figure 2:
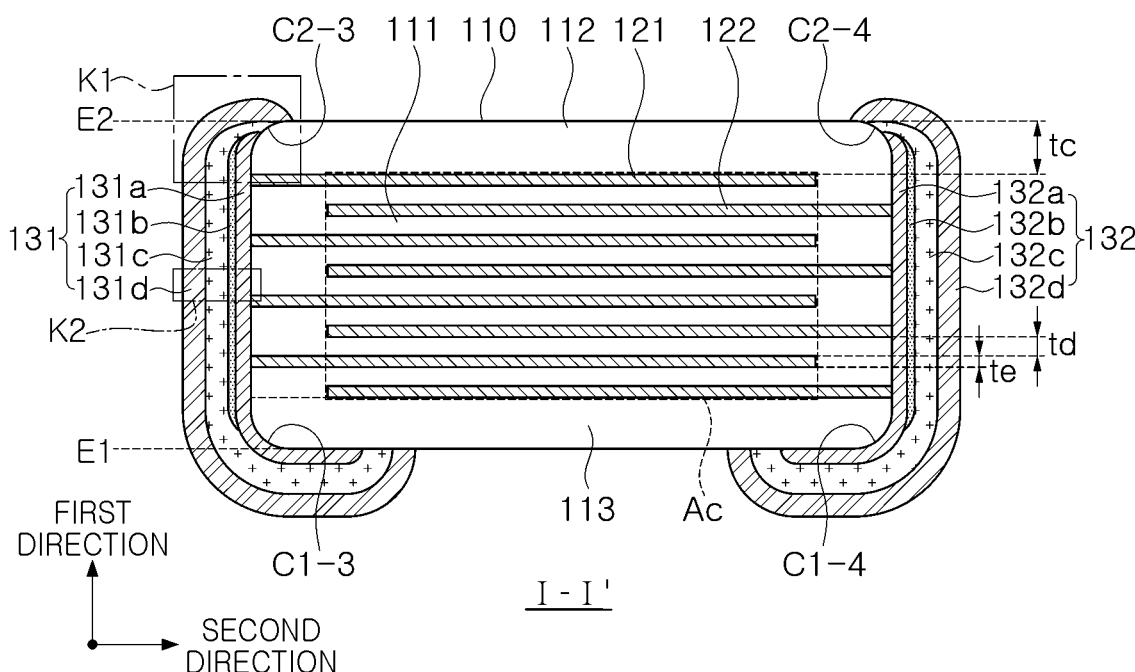
FIG. 2 is a schematic cross-sectional view taken along line I-I' of FIG. 1.

FIG. 2 is a schematic cross-sectional view taken along line I-I' of FIG. 1.

Figure 3:
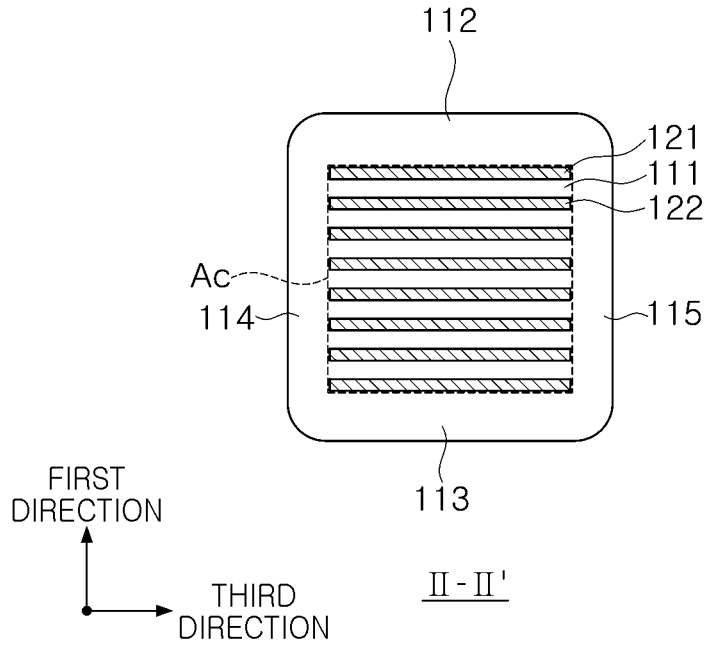
FIG. 3 is a schematic cross-sectional view taken along line II-II' of FIG. 1.

FIG. 3 is a schematic cross-sectional view taken along line II-II' of FIG. 1.

Figure 4:
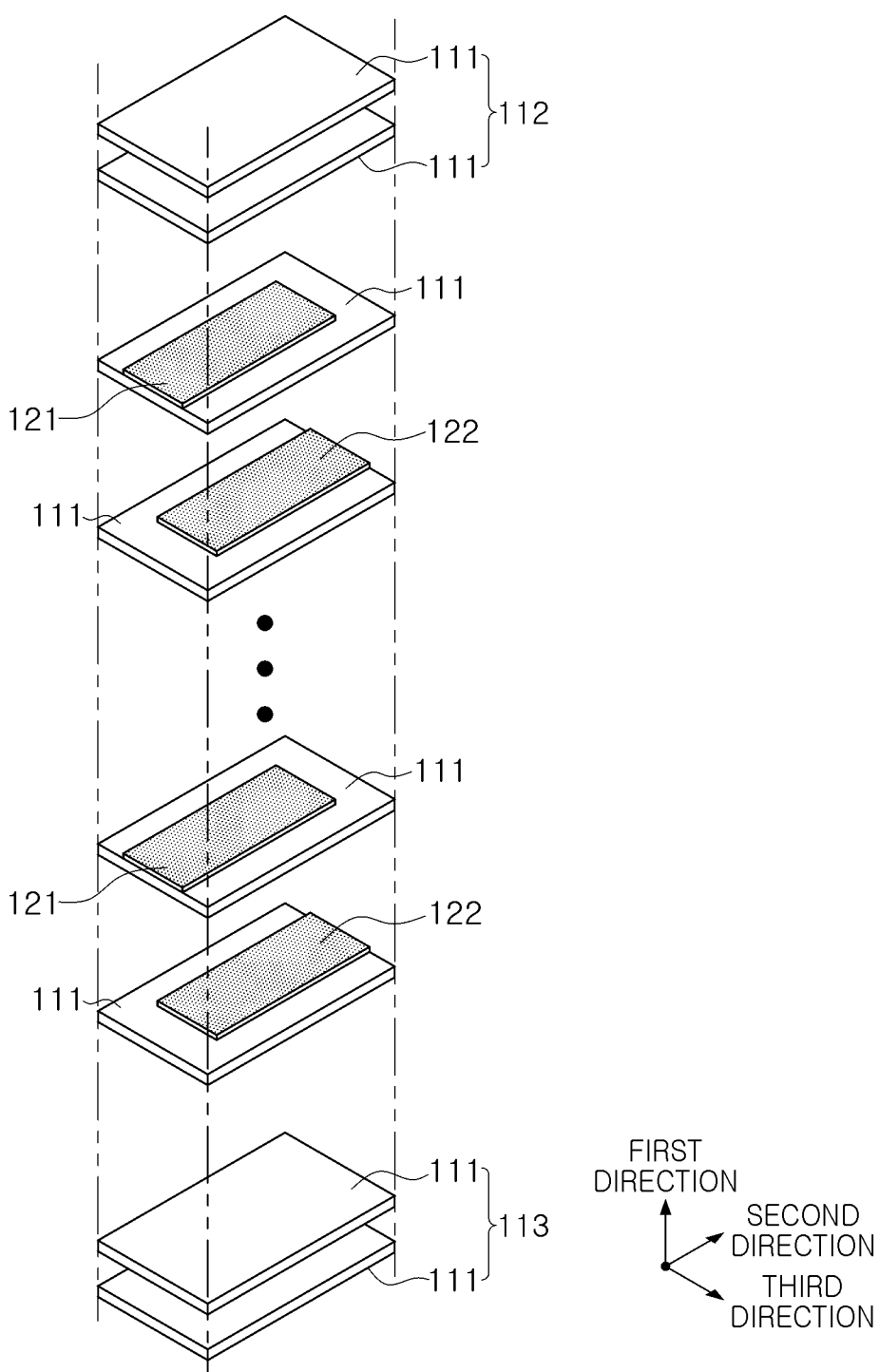
FIG. 4 is an exploded perspective view schematically illustrating an exploded body of FIG. 1.

FIG. 4 is an exploded perspective view schematically illustrating an exploded body of FIG. 1.

Figure 5:
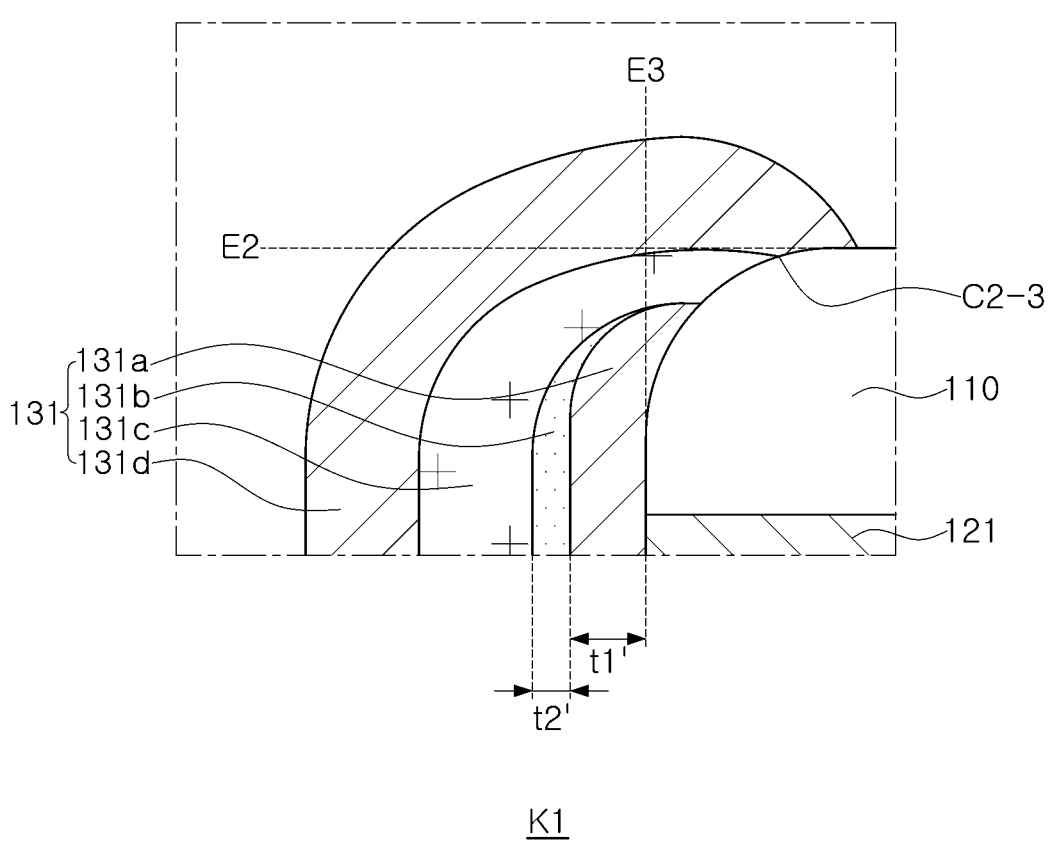
FIG. 5 is an enlarged view of region K1 of FIG. 2.

FIG. 5 is an enlarged view of region K of FIG. 2.

Figure 6:
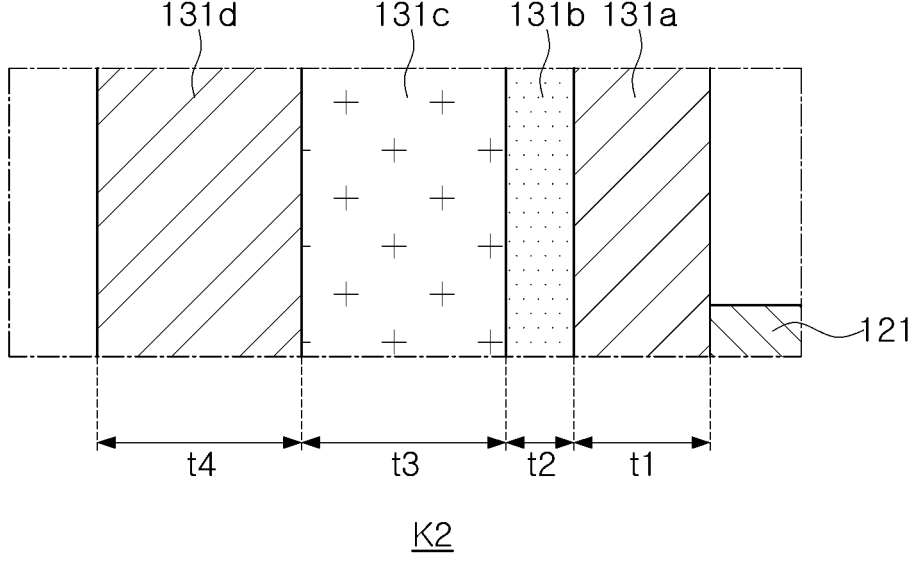
FIG. 6 is an enlarged view of region K2 of FIG. 2.

FIG. 6 is an enlarged view of region K2 of FIG. 2.

Hereinafter, a multilayer electronic component 100 according to an embodiment in the present disclosure will be described with reference to FIGS. 1 to 5. In addition, a multi-layered ceramic capacitor (hereinafter referred to as 'MLCC') will be described as an example of a multilayer electronic component, but the present disclosure is not limited thereto, and it may also be applied to various multilayer electronic components such as an inductor and piezoelectric elements, varistors, thermistors, or the like.

According to an aspect of the present disclosure, a multilayer electronic component 100, may include: a body 110 including a dielectric layer 111 and first and second internal electrodes 121 and 122, alternately disposed with the dielectric layer interposed therebetween in a first direction, the body having first and second surfaces 1 and 2, opposing each other in the first direction, third and fourth surfaces 3 and 4 connected to the first and second surfaces and opposing each other in a second direction, and fifth and sixth surfaces 5 and 6 connected to the first to fourth surfaces and opposing each other in a third direction; a first external electrode 131 including a first base electrode layer 131a disposed on the third surface and connected to the first internal electrode 121, a first thin film electrode layer 131b disposed on the first base electrode layer 131a, and a first plating layer 131c disposed on the first thin film electrode layer; and a second external electrode 132 including a second base electrode layer 132a disposed on the fourth surface and connected to the second internal electrode 122, a second thin film electrode layer 132b disposed on the second base electrode layer 132a, and a second plating layer 132c disposed on the second thin film electrode layer, wherein an average thickness of the first base electrode layer 131a and an average thickness of the second base electrode layer 132a may be 1 μm or more and 3 μm or less, and an average thickness of the first thin film electrode layer and an average thickness of the second thin film electrode layer may be 300 nm or more and 800 nm or less.

In order to achieve miniaturization and high capacitance of the multilayer ceramic capacitor, it is necessary to improve capacitance per unit volume of the multilayer ceramic capacitor by minimizing a volume of the external electrode. The external electrode generally consists of a base electrode layer and a plating layer disposed on the base electrode layer, and when a thickness of the base electrode layer is formed to be as thin as 3 μm or less in order to minimize the volume of the external electrode layer, the base electrode layer may have fine voids in a cross-section of the base electrode layer in first and second directions. Moisture, a plating solution, and the like may permeate into a body through such a void, and there is a concern that reliability may be deteriorated.

On the other hand, according to an embodiment of the present disclosure, even when the average thickness of the base electrode layers 131a and 132a is 3 μm or less, by disposing thin film electrode layers 131b and 132b of 300 nm or more on the base electrode layers 131a and 132a, permeation of moisture, a plating solution, and the like into the body may be prevented, so that reliability of the multilayer electronic component 100 may be improved, and capacitance per unit volume may be improved.

Hereinafter, each included component in the multilayer electronic component 100 according to an embodiment of the present disclosure will be described.

The body 110 has a dielectric layer 111 and internal electrodes 121 and 122, alternately stacked therein.

The body 110 is not limited to a particular shape, and may have a hexahedral shape or a shape similar to the hexahedral shape, as illustrated in the drawings. The body 110 may not have a hexahedral shape having perfectly straight lines because ceramic powder particles included in the body 110 are contracted in a process in which the body is sintered. However, the body 110 may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4, and opposing each other in a third direction.

In an embodiment, the body 110 may have a 1-3 corner (c1-3) connecting the first and third surfaces, a 1-4 corner (c1-4) connecting the first and fourth surfaces, a 2-3 corner (c2-3) connecting the second and third surfaces, and a 2-4 corner (c2-4) connecting the second and fourth surfaces, and the 1-3 corner and the 2-3 corner may have a form contracted to a center of the body 110 in the first direction, toward the third surface, and the 1-4 corner and the 2-4 corner may have a form contracted to a center of the body 110 in the first direction, toward the fourth surface.

As a margin region, in which the internal electrodes 121 and 122 are not disposed, overlaps the dielectric layer 111, a step may be formed by thicknesses of the internal electrodes 121 and 122, so that a corner connecting the first surface 1 to the third to fifth surfaces 3 to 5 and/or a corner connecting the second surface 2 to the third to fifth surfaces 3 to 5 may have a shape contracted to a center of the body 110 in the first direction when viewed with respect to the first surface 1 or the second surface 2. Alternatively, by contraction behavior during a sintering process of the body 110, a corner connecting the first surface 1 to the third to sixth surfaces 3 to 6 and/or a corner connecting the second surface 2 to the third to sixth surfaces 3 to 6 may have a shape contracted to a center of the body 110 in the first direction when viewed with respect to the first surface 1 or the second surface 2. Alternatively, as a corner connecting respective surfaces of the body 110 to each other is rounded by performing an additional process to prevent chipping defects, or the like, a corner connecting the first surface 1 to the third to sixth surfaces 3 to 6 and/or a corner connecting the second surface 2 to the third to sixth surfaces 3 to 6 may have a rounded shape.

The corner may include a 1-3 corner connecting the first surface 1 and the third surface 3, a 1-4 corner connecting the first surface 1 and the fourth surface 4, a 2-3 corner connecting the second surface 2 and the third surface 4, and a 2-4 corner connecting the second surface 2 and the fourth surface 4. In addition, the corner may include a 1-5 corner connecting the first surface 1 and the fifth surface 5, a 1-6 corner connecting the first surface 1 and the sixth surface 6, a 2-5 corner connecting the second surface 2 and the fifth surface 5, and a 2-6 corner connecting the second surface 2 and the sixth surface 6. The first to sixth surfaces of the body 110 may be overall planar surfaces, and non-planar regions may be corners. Hereinafter, an extension line of each surface may refer to a line extending based on a planar portion of each surface.

Meanwhile, in order to suppress a step formed by the internal electrodes 121 and 122, after the internal electrodes are cut so as to be exposed to the fifth and sixth surfaces 5 and 6 of the body after lamination, when margin portions 114 and 115 are formed by laminating a single dielectric layer or two or more dielectric layers on both side surfaces of the capacitance formation portion Ac in a third direction (width direction), a portion connecting the first surface 1 to the fifth and sixth surfaces 5 and 6 and a portion connecting the second surface 2 to the fifth and sixth surfaces 5 and 6 may not have a contracted form.

A plurality of dielectric layers 111 forming the body 110 may be in a sintered state, and adjacent dielectric layers 111 may be integrated with each other, such that boundaries therebetween may not be readily apparent without using a scanning electron microscope (SEM).

According to an embodiment of the present disclosure, a raw material for forming the dielectric layer 111 is not particularly limited, as long as sufficient electrostatic capacitance may be obtained therewith. For example, the raw material for forming the dielectric layer 111 may be a barium titanate ($BaTiO_3$)-based material, a lead composite perovskite-based material, a strontium titanate ($SrTiO_3$)-based material, or the like. The barium titanate-based material may include $BaTiO_3$-based ceramic powder, and the ceramic powder may be, for example, $BaTiO_3$, $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, in which calcium (Ca), zirconium (Zr), or the like, are partially dissolved in $BaTiO_3$, and the like.

In addition, a raw material of the dielectric layer 111 may include various ceramic additives, organic solvents, binders, dispersants, and the like, added to powder particles such as barium titanate ($BaTiO_3$) powder particles, or the like, according to an object of the present disclosure.

Meanwhile, a thickness of the dielectric layer 111 does not need to be particularly limited.

However, in general, when the dielectric layer is formed to be thin to have a thickness of less than 0.6 μm, it may be vulnerable to deterioration in reliability by moisture, a plating solution, and the like, permeating into the body.

According to an embodiment of the present disclosure, even when an average thickness of the base electrode layers 131a and 132a is 3 μm or less, by disposing thin film electrode layers 131b and 132b of 300 nm or more on the base electrode layers 131a and 132a, it is possible to prevent moisture, a plating solution, and the like, from permeating into the body, so that even when an average thickness "td" of at least one of the plurality of dielectric layers 111 is 0.35 μm or less, excellent reliability may be secured.

Therefore, when the average thickness "td" of at least one of the plurality of dielectric layers 111 is 0.35 μm or less, a reliability improvement effect according to the present disclosure may be more remarkable.

The average thickness "td" of the dielectric layer 111 may mean an average thickness of the dielectric layer 111 disposed between the first and second internal electrodes 121 and 122 in the first direction.

The average thickness of the dielectric layer 111 may be measured from an image obtained by scanning a cross-section of the body 110 in length and thickness directions (L-T directions) with a scanning electron microscope (SEM) with a magnification of 10,000. More specifically, an average value may be measured by measuring a thickness of one dielectric layer at 30 equally spaced points in the length direction from the scanned image. The 30 points having equal intervals may be designated in the capacitance formation portion Ac. In addition, if the average value is measured by extending the average value measurement to 10 dielectric layers, the average thickness of the dielectric layers can be more generalized.

The body 110 may include a capacitance formation portion Ac disposed in the body 110, and including a first internal electrode 121 and a second internal electrode 122 disposed to oppose each other with the dielectric layer 111 interposed therebetween and having capacitance formed therein, and cover portions 112 and 113 formed above and below the capacitance formation portion Ac in the first direction.

In addition, the capacitance formation portion Ac is a portion serving to contribute to capacitance formation of a capacitor, and may be formed by repeatedly laminating a plurality of first and second internal electrodes 121 and 122 with a dielectric layer 111 interposed therebetween.

The cover portions 112 and 113 may include an upper cover portion 112 disposed above the capacitance formation portion Ac in the first direction, and a lower cover portion 113 disposed below the capacitance formation portion Ac in the first direction.

The upper cover portion 112 and the lower cover portion 113 may be formed by laminating a single dielectric layer or two or more dielectric layers on the upper and lower surfaces of the capacitance formation portion Ac in a thickness direction, respectively, and the upper cover portion 112 and the lower cover portion 113 may serve to basically prevent damage to the internal electrodes due to physical or chemical stress.

The upper cover portion 112 and the lower cover portion 113 may not include internal electrodes, and may include the same material as that of the dielectric layer 111.

That is, the upper cover portion 112 and the lower cover portion 113 may include a ceramic material, for example, a barium titanate (BaTiO$_3$)-based ceramic material.

Meanwhile, a thickness of the cover portions 112 and 113 need not be particularly limited. However, a thickness "tc" of the cover portions 112 and 113 may be 15 μm or less in order to more easily achieve miniaturization and high capacitance of the multilayer electronic component.

The average thickness "tc" of the cover portions 112 and 113 may mean a size thereof in the first direction, and may be a value obtained by averaging sizes of the cover portions 112 and 113 measured in the first direction at five points having equal intervals above or below the capacitance formation portion Ac.

In addition, margin portions 114 and 115 may be disposed on a side surface of the capacitance formation portion Ac.

The margin portions 114 and 115 may include a first margin portion 114 disposed on the fifth surface 5 of the body 110 and a second margin portion 115 disposed on the sixth surface 6 thereof. That is, the margin portions 114 and 115 may be disposed on both end surfaces of the body in a width direction.

The margin portions 114 and 115 may mean a region between both ends of the first and second internal electrodes 121 and 122 and an interface of the body 110 in a cross-section of the body 110 taken in a width-thickness (W-T) direction, as illustrated in FIG. 3.

The margin portions 114 and 115 may basically serve to prevent damages to the internal electrodes due to physical or chemical stresses.

The margin portions 114 and 115 may be formed by applying a conductive paste to the ceramic green sheet, except where margin portions are to be formed, to form an internal electrode.

In addition, in order to suppress a step by the internal electrodes 121 and 122, after the internal electrodes are cut so as to be exposed to the fifth and sixth surfaces 5 and 6 of the body after lamination, the margin portions 114 and 115 may also be formed by laminating a single dielectric layer or two or more dielectric layers on both side surfaces of the capacitance formation portion Ac in the third direction (width direction).

Meanwhile, a width of the margin portions 114 and 115 is not particularly limited. However, in order to more easily implement miniaturization and high capacitance of the multilayer electronic component, an average width of the margin portions 114 and 115 may be 15 μm or less.

The average width of the margin portions 114 and 115 may mean an average size of the margin portions 114 and 115 in a third direction, and may be a value obtained by averaging sizes of the margin portions 114 and 115 measured at five points having equal intervals in the third direction in terms of the capacitance formation portion Ac.

Accordingly, in an embodiment, an average size of a region in which the internal electrodes 121 and 122 are spaced apart from the fifth and sixth surfaces in the third direction may be 15 μm or less, respectively.

The internal electrodes 121 and 122 may include first and second internal electrodes 121 and 122. The first and second internal electrodes 121 and 122 may be alternately disposed to oppose each other with the dielectric layer constituting the body 110 interposed therebetween, and may be exposed to the third and fourth surfaces 3 and 4 of the body 110, respectively.

The first internal electrode 121 may be spaced apart from the fourth surface 4 and exposed through the third surface 3, and the second internal electrode 122 may be spaced apart from the third surface 3 and exposed through the fourth surface 4. A first external electrode 131 may be disposed on the third surface 3 of the body to be connected to the first internal electrode 121, and a second external electrode 132 may be disposed on the fourth surface 4 of the body to be connected to the second internal electrode 122.

That is, the first internal electrode 121 is not connected to the second external electrode 132, but is connected to the first external electrode 131, and the second internal electrode 122 is not connected to the first external electrode 131, but is connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance. In addition, the first and second internal electrodes 121 and 122 may be spaced apart from the fifth and sixth surfaces 5 and 6 of the body 110.

In this case, the first and second internal electrodes 121 and 122 may be electrically isolated from each other by the dielectric layer 111 disposed in a middle.

The body 110 may be formed by alternately laminating a ceramic green sheet on which the first internal electrode 121 is printed and a ceramic green sheet on which the second internal electrode 122 is printed, followed by sintering.

A material for forming the internal electrodes 121 and 122 are not particularly limited, and as the material, a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for the internal electrodes including at least one of nickel (Ni), copper (Cu), palladium (Pd), silver (Ag), gold (Au), platinum (Pt), tin (Sn), tungsten (W), titanium (Ti) and an alloy thereof on a ceramic green sheet. A method for printing the conductive paste for the internal electrodes may be a screen printing method or a gravure printing method, but the present disclosure is not limited thereto.

Meanwhile, a thickness of the internal electrodes 121 and 122 does not need to be particularly limited.

However, in general, when the internal electrode is formed thin to have a thickness of 0.6 μm or less, in particular, when the thickness of the internal electrode is 0.35 μm or less, it may be vulnerable to deterioration in reliability by moisture, a plating solution, and the like, permeating into the body.

However, even when an average thickness of the base electrode layers 131a and 132a is 3 μm or less, by disposing thin film electrode layers 131b and 132b of 300 nm or more on the base electrode layers 131a and 132a, it is possible to prevent moisture, a plating solution, and the like, from permeating into the body, so that even when an average thickness "te" of at least one of the plurality of internal electrodes 121 and 122 is 0.35 μm or less, excellent reliability may be secured.

Accordingly, when the average thickness "te" of at least one of the plurality of internal electrodes 121 and 122 is 0.35 μm or less, an effect according to the present disclosure may be more remarkable, and miniaturization and high capacitance of the multilayer electronic component may be more easily achieved.

The average thickness "te" of the internal electrodes 121 and 122 may mean an average size of the internal electrodes 121 and 122 in the first direction.

The average thickness of the internal electrodes 121 and 122 may be measured by scanning an image of a cross-section of the body 110 in the length and thickness directions (L-T directions) with a scanning electron microscope (SEM) with a magnification of 10,000. More specifically, an average value may be measured by measuring a thickness of one dielectric layer at 30 equally spaced points in the length direction from the scanned image. The 30 points having equal intervals may be designated in the capacitance formation portion Ac. In addition, if the average value is measured by extending the average value measurement to 10 internal electrodes, the average thickness of the internal electrodes can be more generalized.

External electrodes 131 and 132 may be disposed on the third surface 3 and the fourth surface 4 of the body 110.

The external electrodes 131 and 132 may include first and second external electrodes 131 and 132 respectively disposed on the third and fourth surfaces 3 and 4 of the body 110, to be respectively connected to the first and second internal electrodes 121 and 122.

Meanwhile, in the present embodiment, a structure in which the multilayer electronic component 100 has two external electrodes 131 and 132 is described. However, the number and shape of the external electrodes 131 and 132 may be changed according to the shape of the internal electrodes 121 and 122 or any other purposes.

The external electrodes 131 and 132 may include base electrode layers 131a and 132a connected to the internal electrodes 131 and 132, thin film electrode layers 131b and 132b disposed on the base electrode layers 131a and 132a, and plating layers 131c and 132c disposed on the thin film electrode layers 131b and 132b. The first external electrode 131 may include a first base electrode layer 131a disposed on the third surface 3 and connected to the first internal electrode 121, a first thin film electrode layer 131b disposed on the first base electrode layer, and a first plating layer 131c disposed on the first thin film electrode layer 131b, and the second external electrode 132 may include a second base electrode layer 132a disposed on the fourth surface 4 and connected to the second internal electrode 122, a second thin film electrode layer 132b disposed on the second base electrode layer, and a second plating layer 132c disposed on the second thin film electrode layer 132b.

The base electrode layers 131a and 132a may serve to electrically connect the internal electrodes 121 and 122 and the external electrodes 131 and 132. In addition, the thin film electrode layers 131b and 132b may serve to prevent moisture, a plating solution, and the like from permeating into the body 110.

When the base electrode layers 131a and 132a are formed to be thick, permeation of moisture, plating solution, and the like into the body may be prevented to some extent without forming separate thin film electrode layers 131b and 132b. However, as in the present disclosure, when the base electrode layers 131a and 132a are formed to be thin, fine voids of the base electrode layers 131a and 132a may be formed so that moisture, a plating solution, and the like may permeate into the body 110. Accordingly, according to an embodiment of the present disclosure, by forming the thin film electrode layers 131b and 132b on the base electrode layers 131a and 132a, it is possible to prevent moisture, a plating solution, and the like from permeating into the body.

An average thickness of the first base electrode layer 131a and an average thickness of the second base electrode layer 132a may be 1 μm or more and 3 μm or less, and an average thickness of the first thin film electrode layer 131b and an average thickness of the second thin film electrode layer 132b may be 300 nm or more and 800 nm or less.

When the average thickness of the first base electrode layer 131a and the average thickness of the second base electrode layer 132a are less than 1 μm, connectivity between the external electrodes 131 and 132 and the internal electrodes 121 and 122 may be deteriorated, and when the average thickness of the first base electrode layer 131a and the average thickness of the second base electrode layer 132a exceed 3 μm, it may be difficult to maximize an effect of improving capacitance per unit volume.

When the average thickness of the first thin film electrode layer 131b and the average thickness of the second thin film electrode layer 132b are less than 300 nm, fine voids of the base electrode layers 131a and 132a may not be covered so that there may be a concern that a reliability improvement effect by the thin film electrode layers 131b and 132b is insufficient, and when the average thickness of the first thin film electrode layer 131b and the average thickness of the second thin film electrode layer 132b exceed 800 nm, bonding force between the base electrode layers 131a and 132a and the thin film electrode layers 131b and 132b may be weakened, so that a peeling phenomenon between the base electrode layers 131a and 132a and the thin film electrode layers 131b and 132b may occur. When a peeling phenomenon occurs between the base electrode layers 131a and 132a and the thin film electrode layers 131b and 132b, moisture resistance reliability may deteriorate.

An average thickness of the first base electrode layer 131a, an average thickness of the second base electrode layer 132a, an average thickness of the first thin film electrode layer 131b, and an average thickness of the second thin film electrode layer 132b may be measured from an image scanned using a scanning electron microscope (SEM), after being polished to a center of the multilayer electronic component in a third direction, to expose a cross-section thereof in first and second directions.

Specifically, the average thickness of the first base electrode layer 131a may be measured in a central portion of the body in the first direction in the exposed image, and may be a value averaging a size of the first base electrode layer 131a in the second direction, measured at 10 points equally spaced in the first direction. The average thickness of the second base electrode layer 132a, the average thickness of the first thin film electrode layer 131b, and the average thickness of the second thin film electrode layer 132b may be measured in the same manner.

Hereinafter, description will be made based on the first external electrode 131, but since the second external electrode 132 has a symmetrical relationship with the first external electrode 131 in the second direction, the description may be equally applied to the second external electrode 132.

The base electrode layers 131a and 132a may include a conductive metal. The conductive metal included in the base electrode layers 131a and 132a may be formed using any material as long as it has electrical conductivity, and a specific material may be determined in consideration of electrical characteristics, structural stability, and the like. For example, the conductive metal included in the base electrode layers 131a and 132a may be at least one of nickel (Ni), copper (Cu), palladium (Pd), silver (Ag), gold (Au), platinum (Pt), and alloys thereof. As a more preferable example, the conductive metal included in the base electrode layers 131a and 132a may be nickel (Ni), but an embodiment thereof is not limited thereto.

In an embodiment, the base electrode layers 131a and 132a may include a conductive metal and glass. The conductive metal included in the base electrode layers 131a and 132a serves to secure electrical connectivity, and as the base electrode layers 131a and 132a include glass, bonding force with the body 110 may be improved.

Meanwhile, a method of forming the base electrode layers 131a and 132a does not need to be particularly limited, but it is difficult to form the thickness of the base electrode layer 132a thin when using a dipping method, which is a conventional general external electrode formation method. As a preferred example, the base electrode layers 131a and 132a may be formed using a pad printing method. The pad printing method may refer to a method of forming a base electrode layer on one surface of the body by manufacturing a pad with an external electrode paste on a support and then compressing the body to the pad. In this case, the pad formed of the external electrode paste may include conductive metal and glass, and may include components such as a binder, an organic solvent, and the like.

In an embodiment, a size of the first base electrode layer 131a in the second direction, measured in the center of the body in the first direction is t1, and a size of the first base electrode layer 131a in the second direction measured in the first internal electrode disposed in an outermost portion in the first direction is t1', t1'/t1 may be 0.8 or more and 1.0 or less. As the base electrode layers 131a and 132a are formed by the pad printing method, the base electrode layers 131a and 132a may have a uniform thickness, and t1'/t1 may be easily controlled to be 0.8 or more and 1.0 or less.

In an embodiment, the first and second thin film electrode layers 131b and 132b may have an area ratio of 90% or more occupied by metal in cross-sections thereof in the first and second directions. Accordingly, it is easy to form the thickness of the thin film electrode layers 131b and 132b, so that moisture resistance reliability of the multilayer electronic component 100 may be improved, and capacitance per unit volume may be improved, and fine voids of the base electrode layers 131a and 132a may be more easily covered by the thin film electrode layers 131b and 132b. More preferably, the first and second thin film electrode layers 131b and 132b may have an area ratio of 95% or more, occupied by metal in cross-sections thereof in first and second directions. That is, the first and second thin film electrode layers 131b and 132b may be substantially formed of metal.

A method of forming the first and second thin film electrode layers 131b and 132b is not particularly limited, but in order to form the thin film electrode layers 131b and 132b thinly and densely, the thin film electrode layers 131b and 132b may be formed by a sputtering method, an atomic layer deposition method, or the like.

In an embodiment, the first and second thin film electrode layers 131b and 132b may be sputtering layers. As the first and second thin film electrode layers 131b and 132b are sputtering layers formed using a sputtering method, it is easy to form the thin film electrode layers 131b and 132b thin, so that moisture resistance reliability of the multilayer electronic component may be improved and capacitance per unit volume may be improved, and the fine voids of the base electrode layers 131a and 132a may be more easily covered by the thin electrode layer. Specifically, the metal constituting the thin film electrode layers 131b and 132b may be discharged in an atomic or ionic state and deposited on the body 110 to form the thin film electrode layers 131b and 132b.

A material of forming the thin film electrode layers 131b and 132b may be formed using any material as long as it has electrical conductivity, and a specific material may be determined in consideration of the material and electrical characteristics of the base electrode layers 131a and 132a. For example, the thin film electrode layers 131b and 132b may be at least one of nickel (Ni), copper (Cu), chromium (Cr), silver (Ag), gold (Au), platinum (Pt), palladium (Pd), and alloys thereof. As a more preferable example, the thin film electrode layers 131b and 132b may be one of copper (Cu), chromium (Cr), and Ni—Cr, but an embodiment thereof is not limited thereto.

In an embodiment, when a size of the first thin film electrode layer 131b in the second direction, measured in a center of the body 110 in the first direction is t2, and a size of the first thin film electrode layer 131b in the second direction, measured in a first internal electrode disposed in an outermost portion thereof in the first direction is t2', t2'/t2 may be 0.9 or more and 1.1 or less. As the thin film electrode layers 131b and 132b are formed by a sputtering method, the thin film electrode layers 131b and 132b may have a uniform thickness, and t2'/t2 can be easily controlled to be 0.9 or more and 1.1 or less.

In an embodiment, in a cross-section of the first base electrode layer 131a in the first and second directions, the first base electrode layer 131a may include at least one void, and the first thin film electrode layer 131b may be disposed to cover the void. Accordingly, it is possible to prevent moisture, a plating solution, and the like from permeating into the void of the first base electrode layer 131a. When the average thickness of the first thin film electrode layer 131b is too thin, the void may not be covered, and a portion of the first thin film electrode layer 131b may be disposed in a cut-off form.

Meanwhile, the first plating layer 131c may be disposed to be spaced apart from the first base electrode layer 131a by the first thin electrode layer 131b in the void.

The plating layers 131c and 132c are disposed on the thin film electrode layers 131b and 132b. The first external electrode 131 may include a first plating layer 131c disposed on the first thin film electrode layer 131b, and the second external electrode 132 may include a second plating layer 132c disposed on the second thin film electrode layer 132b.

The plating layers 131c and 132c serves to improve mounting characteristics. A type of the plating layers 131c and 132c is not particularly limited, and may be a playing layer including Ni, Sn, Pd, and alloys thereof.

In addition, additional plating layers 131d and 132d may be disposed on the plating layers 131c and 132c. The first external electrode 131 may include a first additional plating layer 131d disposed on the first plating layer 131c, and the second external electrode 132 may include a second additional plating layer 132*d* disposed on the second plating layer 132*c*. As a preferable example, the plating layers 131*c* and 132*c* may be Ni plating layers, and the additional plating layers 131*d* and 132*d* may be Sn plating layers or Pd plating layers, but an embodiment thereof is not limited thereto.

In an embodiment, an average thickness of the first plating layer 131*c* and an average thickness of the second plating layers 132*c* may be 2 μm or more and 7 μm or less. Accordingly, the mounting characteristics of the multilayer electronic component can be easily improved. More preferably, the average thickness of the first plating layer 131*c* and the average thickness of the second plating layer 132*c* may be 3 μm or more and 5 μm or less.

In addition, an average thickness of the first additional plating layer 131*d* and an average thickness of the second additional plating layer 132*d* may be 2 μm or more and 7 μm or less. More preferably, the average thickness of the first additional plating layer 131*d* and the average thickness of the second additional plating layer 132*d* may be 3 μm or more and 5 μm or less.

Meanwhile, in general, an electrode layer of the external electrode may have a structure, thicker than a plating layer, but according to an embodiment of the present disclosure, a sum of an average thickness of the base electrode layers 131*a* and 132*a* and an average thickness of the thin film electrode layers 131*b* and 132*b* may be smaller than a sum of an average thickness of the plating layers 131*c* and 132*c* and an average thickness of additional plating layers 131*d* and 132*d*. Accordingly, capacitance per unit volume of the multilayer electronic component can be further improved.

Therefore, the sum of the average thickness of the first base electrode layer 131*a* and the average thickness of the first thin film electrode layer 131*b* may be smaller than the sum of the average thickness of the first plating layer 131*c* and the average thickness of the first additional plating layers 131*d* and 132*d*.

Furthermore, the sum of the average thickness of the first base electrode layer 131*a* and the average thickness of the first thin film electrode layer 131*b* may be smaller than the average thickness of the first plating layer 131*c*. Referring to FIG. 6, a thickness "t1" of the first base electrode layer measured in a central portion of the body in a first direction may be smaller than a thickness "t3" of the first plating layer, and may be smaller than a thickness "t4" of the first additional plating layer.

In an embodiment, the base electrode layers 131*a* and 132*a* may be disposed below an extension line E2 of a second surface 2, and may include a band portion disposed to extend onto the first surface 1. The first base electrode layer 131*a* may be disposed below the second extension line E2 of the second surface 2 and may include a first band portion disposed to extend onto the first surface 1, and the second base electrode layer 132*a* may be disposed below the extension line E2 of the second surface 2, and may include a second band portion disposed to extend onto the first surface 1.

In this case, one end of the first base electrode layer 131*a* may be disposed on a 2-3 corner (c2-3) connecting the second and third surfaces, and the other end of the first base electrode layer may be disposed on the first surface 1. One end of the second base electrode layer 132*a* may be disposed on a 2-4 corner (c2-4) connecting the second and fourth surfaces, and the other end of the second base electrode layer 132*a* may be disposed on the first surface 1.

As the base electrode layers 131*a* and 132*a* are disposed below an extension line E2 of the second surface 2, capacitance per unit volume of the multilayer electronic component 100 may be improved, and as the base electrode layers 131*a* and 132*a* include a band portion disposed to extend onto the first surface 1, it may be easily mounted on a substrate. Meanwhile, the band portion of the base electrode layer may be formed by a printing conductive paste, separately on the first surface 1 of the body.

In an embodiment, the thin film electrode layers 131*b* and 132*b* may be disposed between an extension line E2 of the second surface 2 and an extension line E1 of the first surface 1. Since permeation of moisture, a plating solution, and the like, may easily occur in a cross-section thereof from which an internal electrode is exposed, the thin film electrode layers 131*b* and 132*b* may be disposed between the extension line E2 of the second surface 2 and the extension line E1 of the first surface 1 and the thin film electrode layers 131*b* and 132*b* may be minimally disposed, so that the moisture resistance reliability of the multilayer electronic component 100 may be improved.

Figure 7:
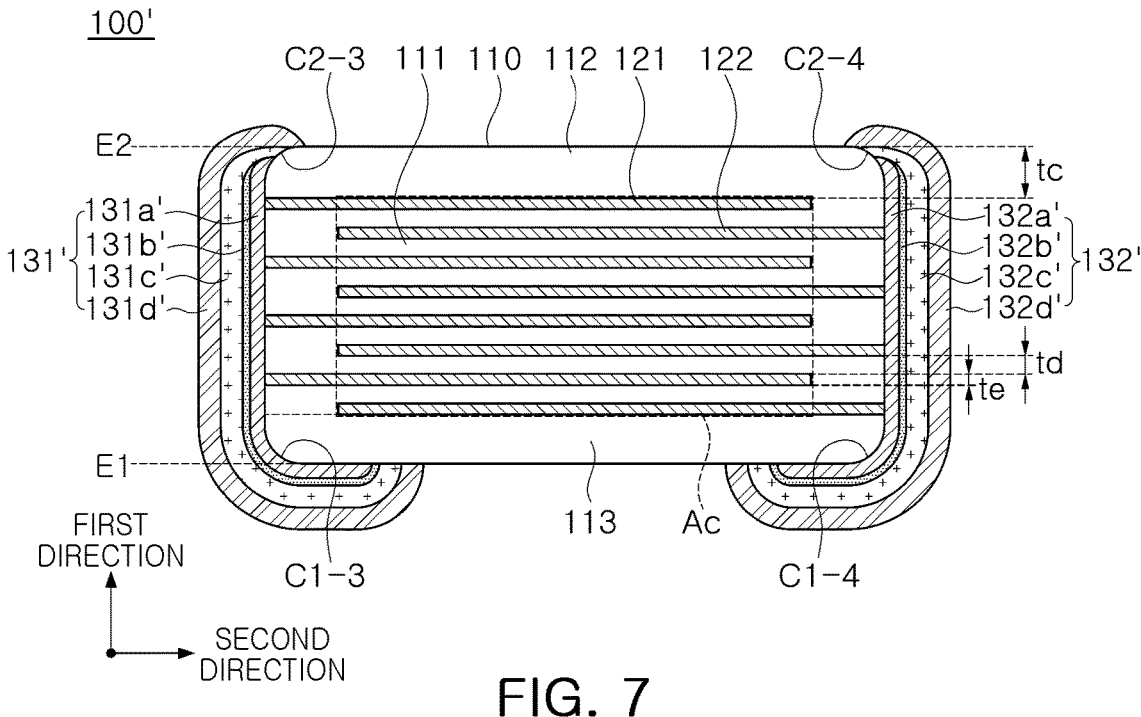
FIG. 7 schematically illustrates a cross-section of a multilayer electronic component in first and second directions according to a modified example of the present disclosure.

However, an embodiment thereof is not limited thereto, and referring to FIG. 7, schematically illustrating a cross-section of a multilayer electronic component 100' in first and second cross-sections according to a modified example of the present disclosure, base electrode layers 131*a'* and 132*a'* may be disposed below the extension line E2 of the second surface 2, and may include a band portion disposed to extend onto the first surface 1, and thin film electrode layers 131*b'* and 132*b'* may be disposed below the extension line E2 of the second surface 2, and disposed to cover the band portion. The first thin film electrode layer 131*b'* may be disposed below the extension line E2 on the second surface 2, and may be disposed to cover the first band portion of the first base electrode layer 131*a'*, and the second thin film electrode layer 132*b'* may be disposed below the extension line E2 of the second surface 2, and may be disposed to cover the second band portion of the second base electrode layer 132*a'*. Thereby, moisture resistance reliability can be further improved. In addition, plating layers 131*c'* and 132*c'* may be disposed to cover the base electrode layers 131*a'* and 132*a'* and the thin film electrode layers 131*b'* and 132*b'*, and the external electrodes 131' and 132' may be additional plating layers 131*d'* and 132*d'* disposed on the plating layers 131*c'* and 132*c'*.

Figure 8:
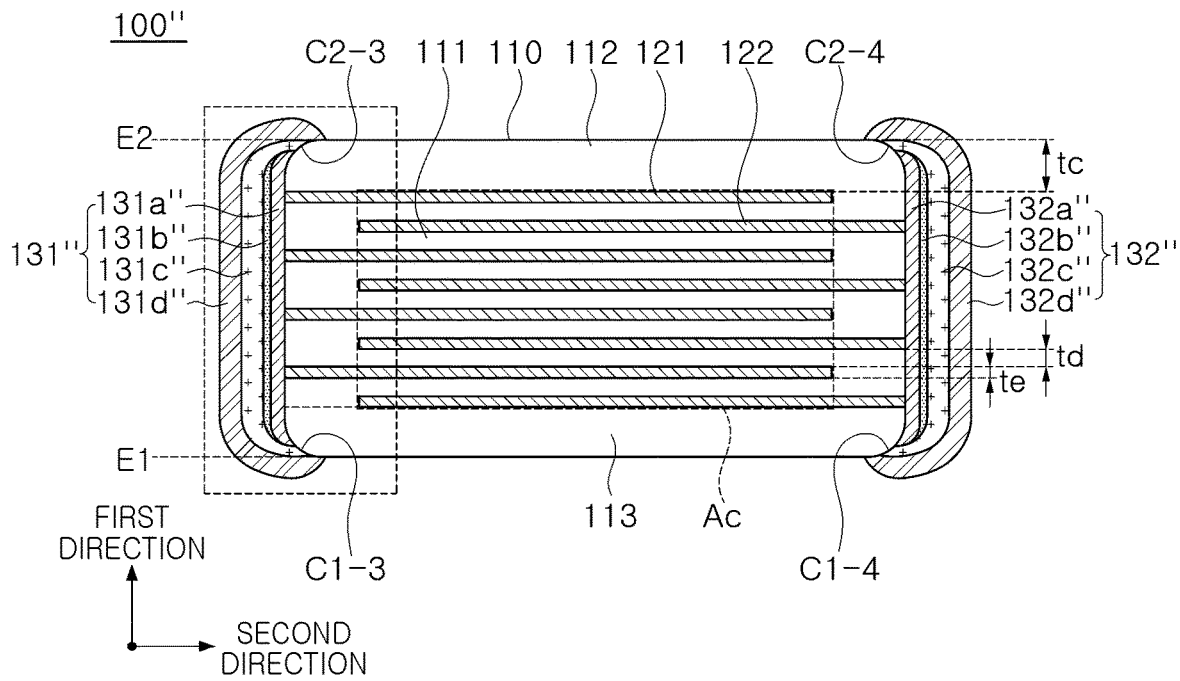
FIG. 8 schematically illustrates a cross-section of a multilayer electronic component in first and second directions according to another modified example of the present disclosure.

Meanwhile, referring to FIG. 8 schematically illustrating a cross-section of a multilayer electronic component 100" in first and second directions according to another modified example of the present disclosure, as base electrode layers 131*a"* and 132*a"* are disposed between the extension line E2 of the second surface 2 and the extension line E1 of the first surface 1, capacitance per unit volume of the multilayer electronic component 100" may be further improved. Accordingly, in an embodiment, the first and second base electrode layers 131*a"* and 132*a"* may be disposed between the extension line E2 of the second surface 2 and the extension line E1 of the first surface 1.

In this case, the first and second thin film electrode layers 131*b"* and 132*b"* may also be disposed between the extension line E2 of the second surface 2 and the extension line E1 of the first surface 1. However, as the plating layers 131*c"* and 132*c"* and the additional plating layers 131*d"* and 132*d"* are formed beyond the extension line E2 of the second surface 2 and the extension line E1 of the first surface 1, the external electrodes 131" and 132" may be formed beyond the extension line E2 of the second surface 2 and the extension line E1 of the first surface 1.

In this case, one end of the first base electrode layer 131*a"* may be disposed on a 2-3 corner (c2-3) connecting the second and third surfaces, and the other end of the first base electrode layer 131a" may be disposed on a 1-3 corner (c1-3) connecting the first and third surfaces. One end of the second base electrode layer 132a" may be disposed on a 2-4 corner (c2-4) connecting the second and fourth surfaces 2 and 4, and the other end of the second base electrode layer 132a" may be disposed on a 1-4 corner (c1-4) connecting the first surface and fourth surfaces 1 and 4.

A size of the multilayer electronic component 100 does not need to be limited.

However, to achieve both miniaturization and high capacitance, since the number of laminated layers should be increased by thinning dielectric layers and internal electrodes, an effect of improving reliability and capacitance per unit volume may become more remarkable in the multilayer electronic component 300 having a size of 1005 (length× width, 1.0 mm×0.5 mm).

Accordingly, when the multilayer electronic component 100 has a length of 1.1 mm or less and a width of 0.55 mm or less in consideration of a manufacturing error, a size of an external electrode, and the like, a reliability improvement effect according to the present disclosure may be more remarkable. Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

EXAMPLE

An average thickness of base electrode layers 131a and 132a and an average thickness of thin film electrode layers thereof in the first and second directions, an average thickness of the base electrode layers 131a and 132a, an average thickness of the thin film electrode layers 131b and 132b, whether or not voids occurred in the base electrode layers 131a and 132a, and whether or not voids were covered by the thin film electrode layers 131b and 132 were analyzed by using a scanning electron microscope (SEM).

As for whether or not the void is covered by the thin film electrode layers 131b and 132b, after 50 sample chips for each Test Nos 4 to 9, a case in which the void is not covered by the thin film electrode layers 131b and 132b so that an Ni plating layer is connected to a base electrode layer, was determined to be defective, so the number of defective samples was described.

As for moisture resistance reliability, after 40 sample chips for each Test No. were w prepared, after performing 1 to 3 steps under the condition of temperature of 85° C. and humidity 85%, when insulation resistance drops below 1050, it was determined to be defective and the number of defective samples was described. In step 1, a voltage of 10V was applied for 1 hour, in step 2, a voltage of 15V was applied for 1 hour, and in step 3, a voltage of 20V was applied for 2 hours.

As for tape test defects, as a tape attached to the thin film electrode layer is detached after preparing 10 sample chips for each of Test Nos. 4 to 11, and then attaching a tape having an adhesive strength of 800 gf/in to a thin film electrode layer, a case in which even a portion of the thin film electrode layer are fell off, it was determined to be defective.

TABLE 1

| Test No. | Average thickness of base electrode layer (μm) | Average thickness of thin film electrode layer (nm) | Whether or not voids occur | Whether or not voids are covered | Defects of tape test | Defects of moisture resistance reliability |
|---|---|---|---|---|---|---|
| 1* | 5 | 0 | X | — | — | 0/40 |
| 2* | 3 | 0 | ◯ | — | — | 2/40 |
| 3* | 1 | 0 | ◯ | — | — | 4/40 |
| 4* | 3 | 200 | ◯ | 50/50 | 0/10 | 3/40 |
| 5 | 3 | 300 | ◯ | 0/50 | 0/10 | 0/40 |
| 6 | 3 | 300 | ◯ | 0/50 | 0/10 | 0/40 |
| 7 | 3 | 400 | ◯ | 0/50 | 0/10 | 0/40 |
| 8 | 3 | 600 | ◯ | 0/50 | 0/10 | 0/40 |
| 9 | 3 | 800 | ◯ | 0/50 | 0/10 | 0/40 |
| 10* | 3 | 1000 | ◯ | — | 3/10 | 3/40 |
| 11* | 3 | 1200 | ◯ | — | 4/10 | 5/40 |

*Comparative Example 131b and 132b were adjusted, and whether or not a void occurred in the base electrode layers 131a and 132a, whether or not a void is covered by the thin film electrode layers 131b and 132b, and whether or not a tape test was defective in the thin film electrode layers 131b and 132b were evaluated and described in Table 1 below.

The base electrode layers 131a and 132a were formed by printing a pad containing Ni and glass, in test Nos. 1 to 3, a thin film electrode layer was not formed, in test Nos. 4, 5, 7 to 10, a thin film electrode layer was formed by depositing Cu by a sputtering method, and in test No. 6, a thin film electrode layer was formed by depositing Ni—Cr by a sputtering method.

After polishing a sample chip of each test number to a center thereof in the third direction to expose a cross-section Referring to Table 1, in the case of Test No. 1 in which an average thickness of a base electrode layer is 5 μm, it can be confirmed that no fine voids occurred in the base electrode layer and no moisture resistance defect occurred. However, in the case of Test No. 1, capacitance per unit volume is lowered because a thickness of an external electrode becomes thicker.

Figure 9:
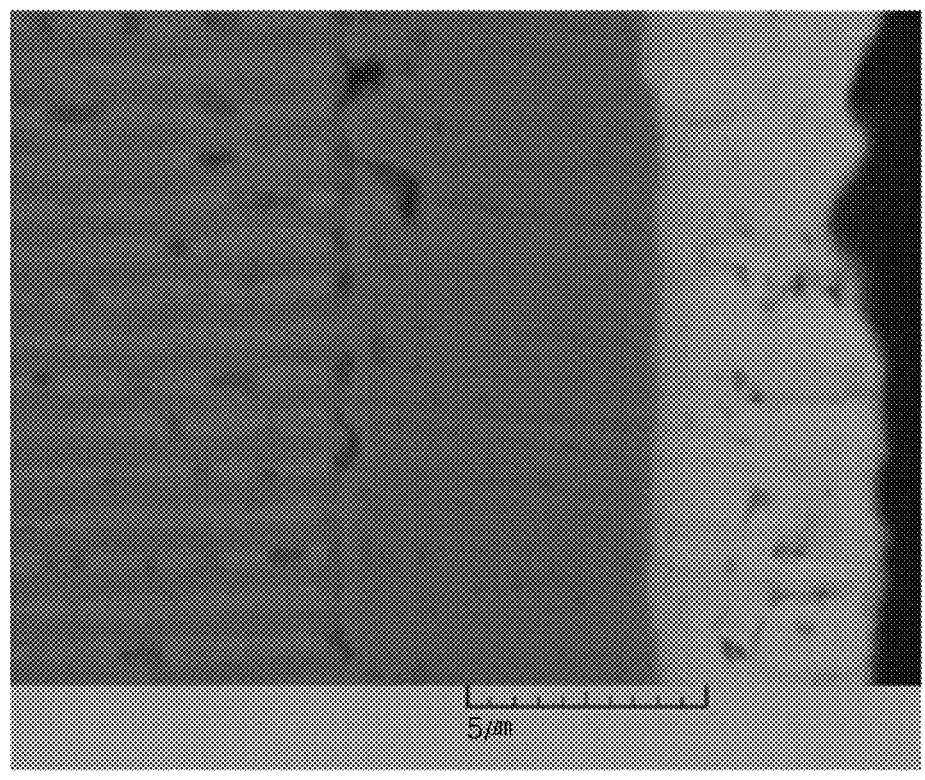
FIG. 9 is an image of an external electrode of Test No. 1, scanned with a scanning electron microscope (SEM).
Figure 10:
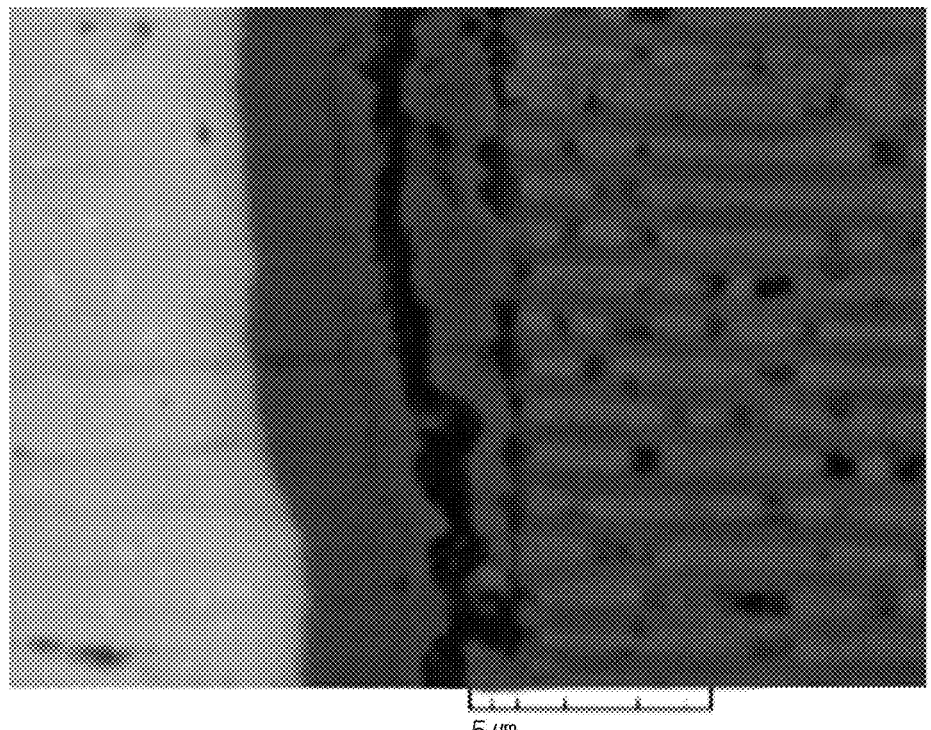
FIG. 10 is an image of an external electrode of Test No. 2, scanned with a scanning electron microscope (SEM).
Figure 11:
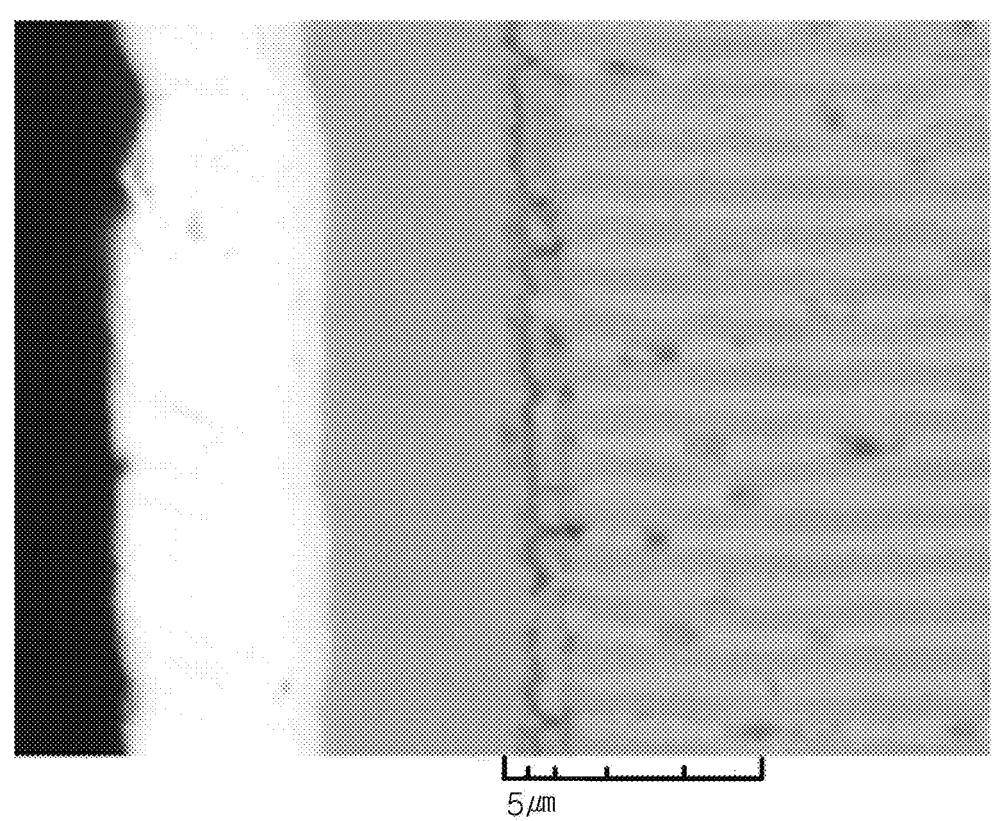
FIG. 11 is an image of an external electrode of Test No. 3, scanned with a scanning electron microscope (SEM).

Referring to FIGS. 9 to 11, which are images of external electrodes of Test Nos. 1 to 3 scanned with a scanning electron microscope (SEM), in Test No. 1 in which an average thickness of a base electrode layer is 5 μm, a void occurred, in Test No. 2 in which an average thickness of a base electrode layer is 3 μm, no void occurred, and in Test No. 3 in which an average thickness of a base electrode layer is 1 μm, more voids occurred than the void in Test No. 2. Accordingly, in Test Nos. 2 and 3, moisture resistance reliability was deteriorated.

Figure 12:
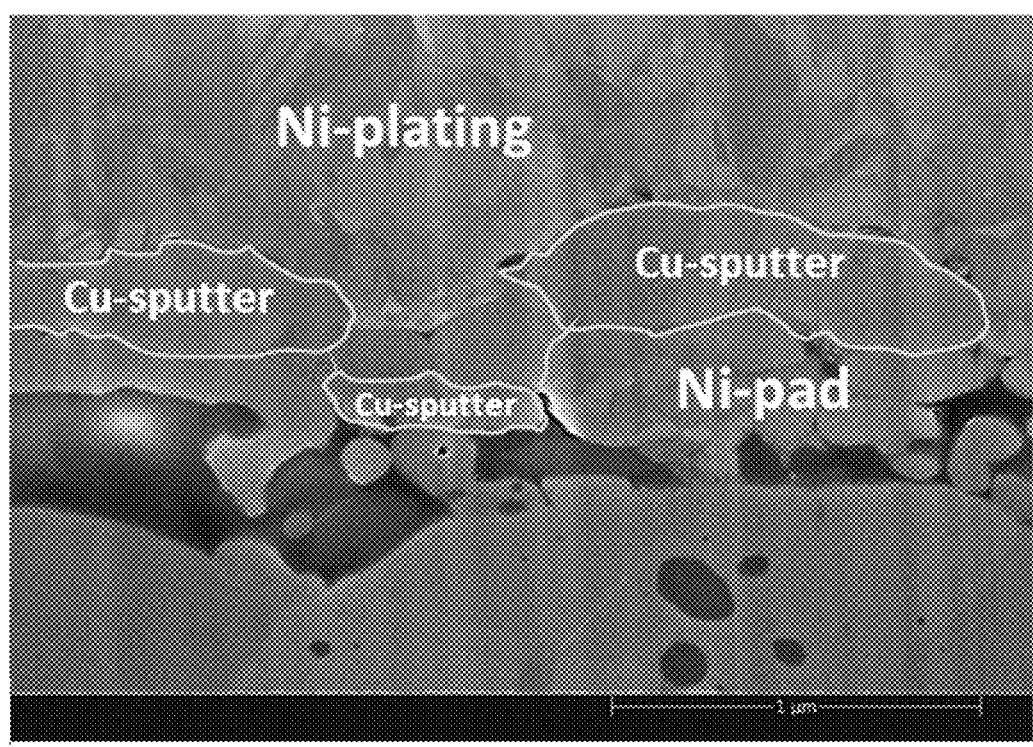
FIG. 12 is an image of an external electrode of Test No. 4, scanned with a scanning electron microscope (SEM).

Meanwhile, in Test No. 4, an average thickness of the thin film electrode layer was 200 nm, not covering a void, so that moisture resistance reliability was deteriorated. Referring to FIG. 12, which is an image of an external electrode of Test No. 4 scanned with a scanning electron microscope (SEM), the thin film electrode layer (Cu-sputter) layer did not cover a void of the base electrode layer (Ni-Pad), so that it can be confirmed that the Ni plating layer and the base electrode layer (Ni-Pad) are connected in the void.

Figure 13:
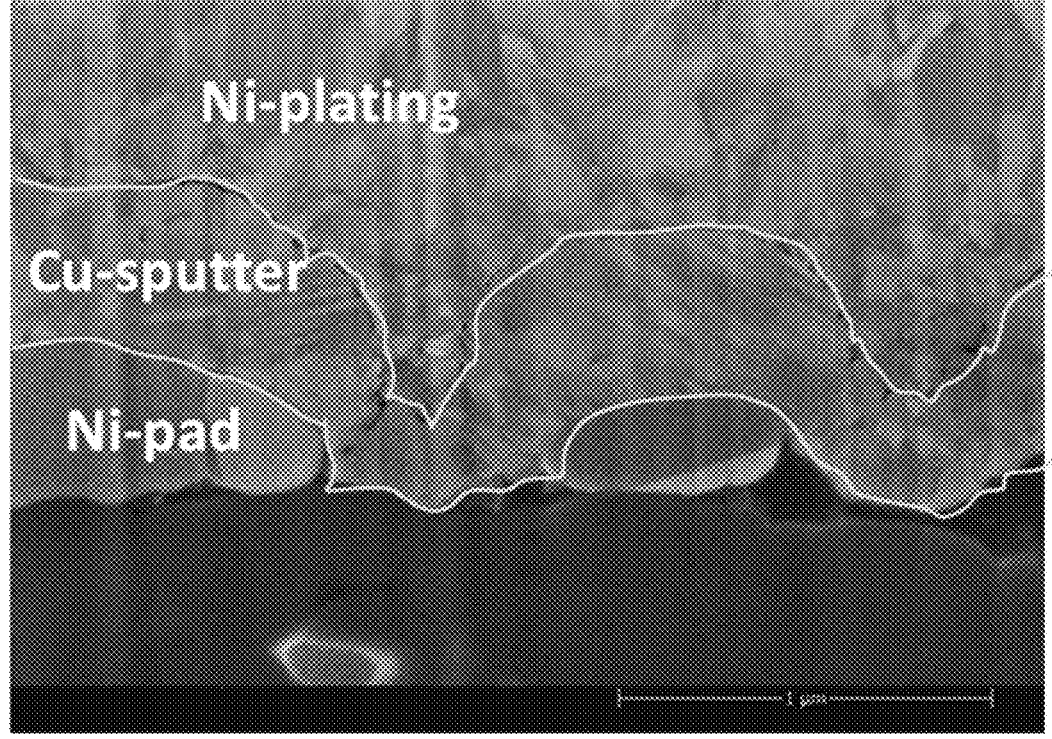
FIG. 13 is an image of an external electrode of Test No. 5, scanned with a scanning electron microscope (SEM).

In Test No. 5, an average thickness of a thin film electrode layer is 300 nm, covering a void, and it can be confirmed that moisture resistance reliability was excellent. Referring to FIG. 13, which is an image of the external electrode of Test No. 5 scanned with a scanning electron microscope (SEM), it can be confirmed that the thin film electrode layer (Cu-sputter) layer covers a void of the base electrode layer (Ni-Pad) so that the Ni plating layer and the base electrode layer (Ni-Pad) are disposed to be spaced apart from the void.

In Test No. 6, Ni—Cr was used as a material of the thin film electrode layer, and an average thickness of a thin film electrode layer is 300 nm, covering a void, so it can be confirmed that moisture resistance reliability was excellent.

In Test Nos. 7 to 9, the thin film electrode layer covered a void of the base electrode layer, so that moisture resistance was excellent.

However, in the case of Test Nos. 10 and 11 in which an average thickness of a thin film electrode layer was 1000 nm or more, defects occurred in the tape test, and it could be confirmed that moisture resistance reliability was also inferior. When the average thickness of the thin film electrode layer is 1000 nm or more, bonding force between the base electrode layer and the thin film electrode layer was reduced.

Therefore, it can be confirmed that the thickness of the thin film electrode layer is preferably 300 nm or more and 800 nm or less in order to secure moisture resistance reliability when the thickness of the base electrode layer is 3 μm or less.

As set forth above, as one of the effects of the present disclosure, reliability of a multilayer electronic component can be improved by disposing a thin film electrode layer on a base electrode layer.

As one of the various effects of the present disclosure, capacitance per unit volume of a multilayer electronic component may be improved.

Although the embodiments of the present disclosure have been described in detail above, the present disclosure is not limited by the above-described embodiments and the accompanying drawings, and is intended to be limited by the appended claims. Therefore, various forms of substitution, modification, and change will be possible by those skilled in the art within the scope of the technical spirit of the present disclosure described in the claims, which also falls within the scope of the present disclosure.

In addition, the expression 'an embodiment' used in the present disclosure does not mean the same embodiment, and is provided to emphasize and describe different unique characteristics. However, an embodiment presented above is not excluded from being implemented in combination with features of another embodiment. For example, even if a matter described in one specific embodiment is not described in another embodiment, it can be understood as a description related to another embodiment, unless there is a description contradicting or contradicting the matter in the other embodiment.

Terms used in this disclosure are only used to describe one embodiment, and are not intended to limit the disclosure. In this case, singular expressions include plural expressions unless the context clearly indicates otherwise.

While example embodiments have been shown and described above, it will be apparent to those skilled in the art that modifications and variations could be made without departing from the scope of the present invention as defined by the appended claims.

What is claimed is:

1. A multilayer electronic component, comprising:
a body including a dielectric layer and first and second internal electrodes alternately disposed with the dielectric layer interposed therebetween in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode including a first base electrode layer disposed on the third surface and connected to the first internal electrode, a first thin film electrode layer disposed on the first base electrode layer, and a first plating layer disposed on the first thin film electrode layer; and
a second external electrode including a second base electrode layer disposed on the fourth surface and connected to the second internal electrode, a second thin film electrode layer disposed on the second base electrode layer, and a second plating layer disposed on the second thin film electrode layer,
wherein an average thickness of the first base electrode layer and an average thickness of the second base electrode layer are 1 μm or more and 3 μm or less, and an average thickness of the first thin film electrode layer and an average thickness of the second thin film electrode layer are 300 nm or more and 800 nm or less,
wherein, in a cross-section of the first base electrode layer in the first and second directions, the first base electrode layer comprises at least one void, and
the first thin film electrode layer covers the void.

2. The multilayer electronic component of claim 1, wherein the first and second base electrode layers comprise conductive metal and glass.

3. The multilayer electronic component of claim 1, wherein, when a size of the first base electrode layer in a second direction, measured in a center of the body in the first direction is t1, and a size of the first base electrode layer in a second direction, measured in a first internal electrode disposed in an outermost portion thereof in the first direction is t1', t1'/t1 is 0.8 or more and 1.0 or less.

4. The multilayer electronic component of claim 1, wherein the first and second thin film electrode layers have an area ratio occupied by metal of 90% or more in a cross-section thereof in the first and second directions.

5. The multilayer electronic component of claim 1, wherein the first and second thin film electrode layers are sputtering layers.

6. The multilayer electronic component of claim 1, wherein, when a size of the first thin film electrode layer in a second direction, measured in a center of the body in the first direction is t2, and a size of the first thin film electrode layer in a second direction, measured in a first internal electrode disposed in an outermost portion thereof in the first direction is t2', t2'/t2 is 0.9 or more and 1.1 or less.

7. The multilayer electronic component of claim 1, wherein, in the cross-section of the first base electrode layer in the first and second directions, the first base electrode layer comprises at least one void, and the first plating layer is disposed to be spaced apart from the first base electrode layer by the first thin film electrode layer in the void.

8. The multilayer electronic component of claim 1, wherein the first external electrode comprises a first additional plating layer disposed on the first plating layer, and the second external electrode comprises a second additional plating layer disposed on the second plating layer.

9. The multilayer electronic component of claim 8, wherein a sum of an average thickness of the first base electrode layer and an average thickness of the first thin film electrode layer is smaller than a sum of an average thickness of the first plating layer and an average thickness of the first additional plating layer.

10. The multilayer electronic component of claim 1, wherein the first base electrode layer is disposed below an extension line of the second surface and comprises a first band portion disposed to extend onto the first surface, and the second base electrode layer is disposed below an extension line of the second surface and comprises a second band portion disposed to extend onto the first surface.

11. The multilayer electronic component of claim 10, wherein a first end of the first base electrode layer is disposed on a corner connecting the second and third surfaces and a second end of the first base electrode layer is disposed on the first surface, and a first end of the second base electrode layer is disposed on a corner connecting the second and fourth surfaces and a second end of the second base electrode layer is disposed on the first surface.

12. The multilayer electronic component of claim 10, wherein the first thin film electrode layer is disposed below an extension line of the second surface and is disposed to cover the first band portion, and the second thin film electrode layer is disposed below an extension line of the second surface and is disposed to cover the second band portion.

13. The multilayer electronic component of claim 1, wherein the first and second thin film electrode layers are disposed between an extension line of the second surface and an extension line of the first surface.

14. The multilayer electronic component of claim 1, wherein the first and second base electrode layers are disposed between an extension of the second surface and an extension line of the first surface.

15. The multilayer electronic component of claim 14, wherein one end of the first base electrode layer is disposed on a corner connecting the second and third surfaces and the other end of the first base electrode layer is disposed on a corner connecting the first and third surfaces, and one end of the second base electrode layer is disposed on a corner connecting the second and fourth surfaces and the other end of the second base electrode layer is disposed on a corner connecting the first and fourth surfaces.

16. A multilayer electronic component, comprising:

a body including a dielectric layer and first and second internal electrodes alternately disposed with the dielectric layer interposed therebetween in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction;

a first external electrode including a first base electrode layer disposed on the third surface and connected to the first internal electrode, and a first plating layer disposed to cover the first base electrode layer; and a second external electrode including a second base electrode layer disposed on the fourth surface and connected to the second internal electrode, and a second plating layer disposed to cover the second base electrode layer, wherein a first thin film electrode layer is disposed between the first base electrode layer and the first plating layer, and two opposing ends of the first thin film electrode layer are disposed between an extension line of the second surface and an extension line of the first surface, and a second thin film electrode layer is disposed between the second base electrode layer and the second plating layer, and two opposing ends of the second thin film electrode layer are disposed between an extension line of the second surface and an extension line of the first surface, wherein the first base electrode layer is disposed below an extension line of the second surface and comprises a first band portion disposed to extend onto the first surface, and the second base electrode layer is disposed below an extension line of the second surface and comprises a second band portion disposed to extend onto the first surface.

17. The multilayer electronic component of claim 16, wherein an average thickness of the first base electrode layer and an average thickness of the second base electrode layer are 1 μm or more and 3 μm or less, and an average thickness of the first thin film electrode layer and an average thickness of the second thin film electrode layer are 300 nm or more and 800 nm or less.

* * * * *